United States Patent [19]

Otsuka et al.

[11] Patent Number: 5,312,659
[45] Date of Patent: May 17, 1994

[54] LAMINATED FILM BAG FOR PACKAGING FOOD

[75] Inventors: Yoshiaki Otsuka; Hideaki Masuo, both of Tokyo; Yotaro Tsutsumi, Kanagawa, all of Japan

[73] Assignee: Toyo Seikan Kaisha Ltd., Tokyo, Japan

[21] Appl. No.: 902,240

[22] Filed: Jun. 23, 1992

[30] Foreign Application Priority Data

Jun. 25, 1991 [JP] Japan .................. 3-248525

[51] Int. Cl.⁵ ............................. B65D 17/28
[52] U.S. Cl. .................. 428/35.2; 428/35.3; 428/43; 428/138; 428/192; 428/458; 428/461; 428/483; 383/200; 229/237
[58] Field of Search ............ 428/35.2, 35.3, 475.2, 428/483, 458, 461, 43, 138, 192; 383/200, 201, 207, 208; 229/237

[56] References Cited

U.S. PATENT DOCUMENTS

| | | | |
|---|---|---|---|
| 2,923,404 | 2/1960 | Adell | 383/200 |
| 3,369,267 | 5/1965 | Friedland et al. | 383/207 |
| 3,812,002 | 5/1974 | Lurie | 428/43 |
| 3,920,122 | 11/1975 | Koehlinger et al. | 428/43 |
| 4,543,279 | 9/1985 | Kai | 383/200 |
| 4,708,896 | 11/1987 | Akao | 428/35.3 |
| 4,903,841 | 2/1990 | Ohsima | 383/200 |
| 5,000,321 | 3/1991 | Heilmann et al. | 229/237 |
| 5,196,247 | 3/1993 | Wu et al. | 428/43 |

FOREIGN PATENT DOCUMENTS 54-137077 10/1989 Japan .

*Primary Examiner*—Ellis P. Robinson
*Assistant Examiner*—Rena L. Dye
*Attorney, Agent, or Firm*—Beveridge, DeGrandi, Weilacher & Young

[57] ABSTRACT

A laminated film bag is made of laminated films each composed of an outermost layer formed of a polyester resin film, an innermost layer formed of a polyolefin resin film and an intermediate layer formed of an aluminum foil, the polyolefin resin film has formed thereon score lines having a depth of 1/20 to ⅔ of the thickness of the polyolefin resin film and an opening width of 0.5 to 7 mm, at intervals of 1 to 15 mm.

8 Claims, 1 Drawing Sheet

LAMINATED FILM BAG FOR PACKAGING FOOD

INTRODUCTION AND BACKGROUND

The present invention relates to a laminated film bag for packaging food, which is made of a laminated film, and in particular a laminated film bag which is suitable for use as a retort pouch food.

Several kinds of conventional bags have been proposed and used for packaging food. For example, several kinds of synthetic resin films have been used therefor. However, the use of only one kind of film for the bag encounters difficulty in providing sufficient effects in order to satisfy various demands for protecting food, such as prevention of oxygen permeation, prevention of moisture evaporation, prevention of permeation by aromatic components and the like. Accordingly, laminated films have been also used to overcome these difficulties.

In particular, the shock resistance strength and the ease of tearing or ease of unsealing raises problems for food packaging bags.

When a bag in which food is packaged is dropped or subjected to a shock, the bag may rupture. If its shock resistance strength is low, the handling thereof becomes very difficult during the physical distribution stage or the like. Further, if its ease of tearing is not good, the part of the bag which serves as the opening can hardly be torn or opened with ease.

The shock-resistance strength and the ease of tearing properties of a bag compete against each other, and are not compatible with each other.

Even if a bag is formed simply with the use of laminated films in which films each having a high ease of tearing, such as uniaxially oriented films or the like are laminated together, the unsealing of the bag is unsatisfactory, causing a high manufacturing cost. When the bag formed of two such laminated films is torn, a shift is encountered during tearing since the tear directions of the two laminated films forming the bag are not precisely coincident with each other in the vertical direction. That is, one of the laminated films is torn further downward so that a vertical shift occurs. The levels of the tear at the opening of the bag do not align with each other at the front and rear sides thereof, and accordingly, there is a high tendency for the contents thereof to spill therefrom.

If a shift in the tear occurs between the front and rear sides of the bag as mentioned above, the position of the downward tear provides an opening to the bag, and accordingly, the contents of the bag spill out, raising the risk of contamination.

In particular, in the case of the packaging of a retort pouch food, the food which is heated up to a high temperature would spill so as to create the disadvantage of a high risk of heat injury.

In a process in which a laminated film is scored by a knife or a slitter, the ease of unsealing can be attained by a some degree, but the shock resistance deteriorates greatly.

SUMMARY OF THE INVENTION

According to the present invention there is provided a laminated film bag for the packaging of a food product, which is formed of a laminated film composed of an outermost layer made of a polyester resin film and an innermost layer made of a polyolefin resin film having a shock resistance strength of higher than 0.5 kg cm. An intermediate layer made of an aluminum foil forms a part of the laminate. The polyolefin film layer has an elongation of less than 1,000 % and is formed during the production of said laminated film with a score line having a depth which is 1/20 to ⅔ of the thickness of the polyolefin resin film layer and a score line opening width of 0.5 to 7 mm, at intervals of 1 to 15 mm. The score line can be formed in various ways in the laminated film bag of the invention. Thus, the score lines can be formed on the polyolefin resin film layer on the surface of the inner surface side of the bag or on the surface which is joined to the aluminum foil. Alternative, the score lines can be formed on both surfaces of the polyolefin resin film layer on the inner surface side of the bag and surface thereof which is joined to the aluminum foil.

In a variation of the invention, the laminated film bag can be include a nylon resin film layer disposed between the polyester film resin layer which is the outermost layer and the aluminum foil.

According to a more detailed aspect of the invention, adhesive layer is disposed between each adjacent lange of the laminated layers.

The shape of the score lines can vary according to the invention. Thus, the score lines can have a trapezoidal section-shape or a V-like sectional-shape having inclined sides which make an angle of 15 to 120 degrees.

It is preferred that the laminated film bag of the invention be provided with a polyolefin resin film layer as the innermost layer with an orientation of more than 0.05.

Pursuant of a further feature of the invention, there is provided a method of manufacturing a laminated film bag for packaging food, wherein the laminated films are each composed of a polyolefin resin film on which score line segments having a depth of 1/20 to ⅔ of the thickness of the polyolefin resin film and an opening width of 0.5 to 7 mm are formed at intervals of 1 to 15 mm and at a temperature higher than the softening temperature of the film. The film is rapidly cooled at a cooling rate of more than 1 degree C./sec after formation of the score lines so as to have an elongation of less than 1,000%. An aluminum foil and a polyester resin film are laminated together with adhesive being deposited between each adjacent layer. These are then superposed with each other and with the polyolefin resin films into close contact with each other, and then are heat-sealed together at three of their respective side peripheral edges.

DETAILED DESCRIPTION OF THE INVENTION

Figure 1:
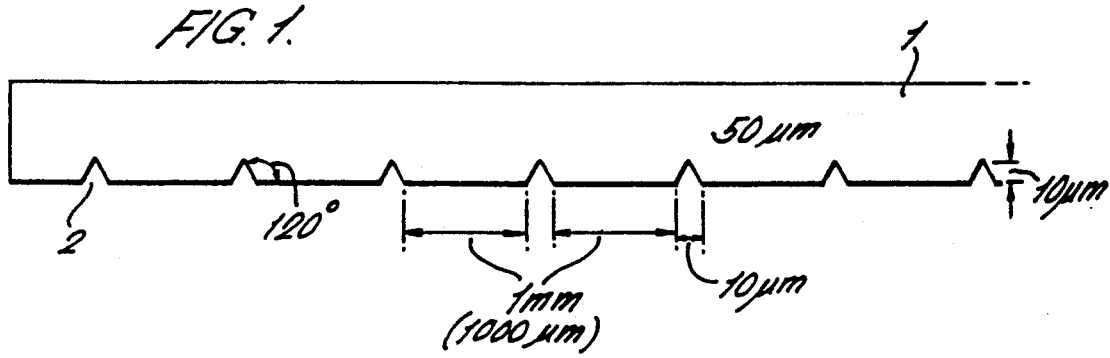
FIG. 1 shows an enlarged cross-section view of polyolefin film having score lines used in the present invention.

As to the polyester resin film used in the present invention, in addition to polyethylene terephthalate, a film composed of polyethylene terephthalate as the main components and a smaller amount of a copolymer of a resin formed of ethylene glycol, with isophthalic acid, a benozonic acid, or naphthalene-1,4-dicarboxylic acid, or naphthalene-2,6-dicarboxylic acid, or a blend thereof can be used.

The thickness of the polyester resin film is preferably 10 to 30 μm.

Further, as to the polyolefin film which has a shock resistance strength of more than 0.5 kg.cm which is measured under the following measuring condition, a copolymer of ethylene-propylene, or polyethylene or the like is used. If the shock resistance strength is less than 0.5 kg.cm, the bag cannot resist against a shock caused by dropping which occurs during physical distribution thereof even though the score lines thereon are created.

Measuring Conditions

Measuring equipment: Pendulum type impact tester (manufactured in Toyo Tester Industry Co., Ltd)

Measuring Temperature: 23 degree C.; and

The tip and shape of a pendulum: Equilateral-triangular pyramid (bottom side 35 mm × 15 mm)

The film thickness is preferably 40 to 100 μm.

As to the aluminum foil, an aluminum foil having a thickness of 7 to 9 μm gives a satisfactory result.

In the case of additionally using polyamide resin film, it is preferably used so as to be laminated between the polyester film and the aluminum foil. Polyamide resin such as nylon 6, nylon 66 or the like is used having a film thickness of 15 to 25 μm.

As to the adhesive with which each adjacent layer is bonded together, a two-liquid reacting type adhesive of the isocyanate type is used. The volume to be used is typically 5 g/m².

According to the present invention, specific score lines are formed on the polyolefin resin film layer in order to impart ease of tearing to the bag. It has been found, with the result of various studies, that thick parts and thin parts are inevitably provided in the polyethylene film layer having a small elongation in order to enhance the tearing ease of the laminated film and to tear the same in a predetermined direction. Tests were conducted of the film which has formed thereon the tear scores with a slitter. However, the shock resistance strength of this bag was greatly lowered. As the result of the study carried out for seeking a cause thereof, it was found that the scores do not have smooth surfaces, but have slight nicks formed at the edges of the scores, which cause the shock resistance strength to be remarkably lowered. The scoring by the slitter or the like cannot prevent occurrence of fine nicks in any way.

Accordingly, the present invention provides thick and thin parts in the film by driving the resin on the surface of the film away laterally on both sides so as to form grooves without cutting by a slitter. Score lines formed according to the invention do not have nicks.

However, it was found that the score lines having a certain shape do not give a substantial effect. With the result of further studies, it was found that a score line having a depth of less than 1/20 of the thickness of the polyolefin resin film does not give a substantial tear effect but a score line having a depth of more than ⅔ of the thickness of the polyolefin resin film lowers the shock resistance strength so as not to be preferable. It was found that the depth of 1/10 to ½ of the thickness of the polyolefin resin film is most preferable.

Further, a score line having an opening width of less than 2 mm does not give a sufficient tear effect, but a score line having an opening width of more than 7 mm lowers the shock resistance strength.

The segments of the score line are formed at intervals of 1 to 15 mm. Score line segments formed at intervals of less than 1 mm lower the shock resistance strength, and those formed at intervals of more then 15 mm cause occurrence of a shift between the front and rear sides of the bag. The score line segments of 3 to 10 mm are most preferable.

The score line has a trapezoidal or V-like cross-sectional shape, having both inclined surfaces making an angle of 15 to 120 degrees. A score line having inclined surfaces with an angle of 30 to 60 degrees is preferable since its tear easiness and shock resistance strength are extremely satisfactory. In addition, a score line having a rectangular, circular or an elliptical cross-sectional shape can be also used.

A polyolefin resin film layer having an elongation of not less than 1,000 % cannot give a satisfactory ease of tearing. Further, less than 0.05 of the orientation thereof lowers the strength of the film so as to be disadvantageous.

An enlarged cross-sectional view of an example of a polyolefin film is shown in FIG. 1.

In FIG. 1 score line 2 has been formed on the polyolefin resin film 1 having a thickness of 50 μm.

In this example, the angle of the score line is 120 degrees. The depth of the score is 10 μm, the width thereof is 10 μm and distance between score lines is 1000 μm.

The polyolefin resin film layer which is bonded to the aluminum foil and which is formed with the score line on the surface opposite to the surface bonded to the aluminum foil gives satisfactory ease of tearing since no adhesive is filled in the score line.

However, since the polyolefin resin film has a tearing strength which is higher than that of the usual adhesive, even though the surface thereof which has formed thereon the score line is bonded to the aluminum foil, the adhesive filled in the score line is broken at first so that the tearing effect is still effective, and accordingly, either surface thereof can be bonded to the aluminum foil. Further, the score lines can be formed on both surface of the polyolefin resin film.

The outermost layer of the laminated film bag according to the present invention is a polyester resin film layer. Polyethylene terephthalate resin has a function which is well adaptable for forming a retort pouch food, that is, it has a satisfactory temperature resistance and a satisfactory printability, is more soil resistant, etc. Therefore, it is preferably used for the outermost layer.

The reason why the aluminum foil is positioned as the intermediate layer, is that the tear easiness increases further, in addition to the fact that it serves as an oxygen barrier.

The reason why the polyolefin film is used as the innermost layer is that the heat-sealing ability is satisfactory and it is not toxic, so that it is safe even though making contact with food.

The laminated film bag for packaging food, according to the present invention, is basically composed of three layers, that is, the polyester resin film layer as the outermost layer, the polyolefin resin film layer as the innermost layer, and the aluminum foil layer as the intermediate layer. However, a nylon resin film layer may be disposed between the polyester resin film layer and the aluminum layer. The provision of the nylon film layer increases the shock resistance strength of the bag.

Adhesive is deposited between each adjacent layer to be laminated which are then bonded together.

In the laminated film bag according to the present invention, score lines are at first formed on a polyolefin resin film having an orientation of more than 0.05, preferably in a range of 0.05 to 0.4. At a temperature higher than the softening point, preferably at a temperature higher than the crystallization temperature, a roll having protrusions for forming score lines is press-contacted with the polyolefin resin film. This results in forming the score lines with a depth of 1/20 to ⅔ of the thickness of the polyolefin resin film and an opening width of 0.5 to 7 mm at intervals of 1 to 15 mm, preferably 3 to 10 mm, in parallel with each other on the polyolefin resin film. Further, after the formation of the score lines, the polyolefin resin film is rapidly cooled at a cooling speed of higher than 1 degree C/sec. Thus, the polyolefin resin film formed thereon with necessary score lines and having an elongation of less than 1,000 %, and an aluminum foil and a polyolefin resin film are laminated together with adhesive therebetween so as to produce a laminated film. The resulting two laminated films are superposed with each other with their polyolefin resin films facing together, and then are heat-sealed at three sides so as to produce a bag.

Figure 2:
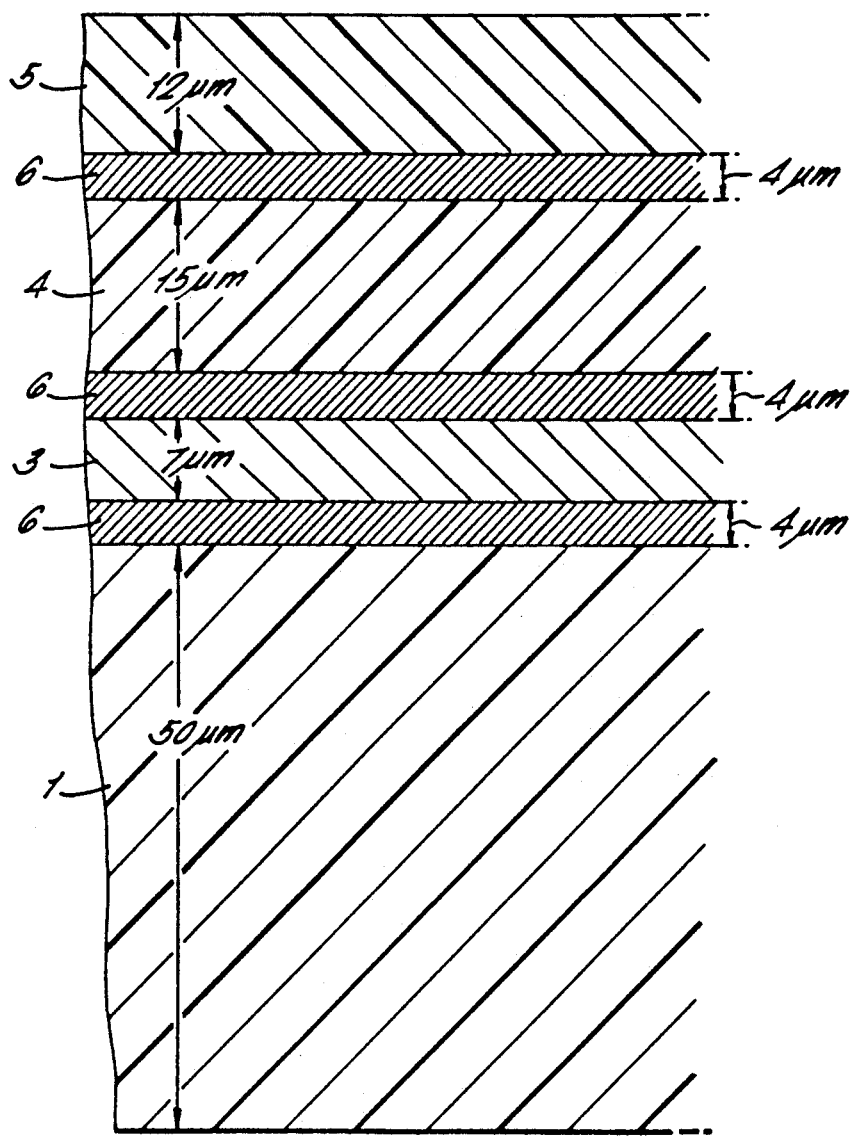
FIG. 2 shows an enlarged cross-section view of the laminated film used for a laminated pouch of the present invention.

FIG. 2 shows an example of enlarged cross-sectional view of the laminated film used to make the pouch. The uppermost layer shown in FIG. 2 is the outer side of the pouch and the lowermost layer forms the inside layer of the pouch. Score lines are formed on the bottom side of the polyolefin film 1 which is 50 μm in thickness. The aluminum foil layer 3 is 7 μm in thickness and is bonded with a 4 μm adhesive layer 6 to the polyolefin film 1.

The aluminum foil 3 is bonded to nylon layer 4 which is 15 μm in thickness.

Polyethylene terephthalate film 5 of 12 μm thickness is bonded on the nylon film 4 with adhesive 4 which is 4 μm in thickness.

Further details of the present invention will be found in the following examples:

EXAMPLE 1

Two of three layer laminated sheets each composed of a polyester resin film having a thickness of 12 μm, an aluminum foil having a thickness of 7 μm and an ethylene-propylene block copolymer film (10 mol % content of ethylene, MI =2.0) which were laminated together with the use of urethane resin group adhesive, having a thickness of 70 μm were superposed with each other with their ethylene-propylene copolymer films facing together, and were then heat-sealed at three sides so as to form bags having a length of 20 mm and width of 130 mm. The shape of the score lines and the like are as shown in Table 1.

TABLE 1

|  | Aluminum Foil | Shape of Score Line Trapezoidal Cross Section | | | Inner Film (Polyolefin) | | |
|---|---|---|---|---|---|---|---|
|  |  | Depth | Space (mm) | Gap Degree | Copolymer | Elong (%) | Other |
| Example 1 | Laminated | 20/70 | 5 | 45 | Block PP (MI-2.0) | 650 | Ext. 250° C. For. 200° C. |
| Comparison Example 1 | Laminated | 2/70 | 5 | 45 | Block PP (MI-2.0) | 650 | Ext. 250° C. For. 200° C. |
| Comparison Example 2 | Laminated | 50/70 | 5 | 45 | Block PP (MI-2.0) | 650 | Ext. 250° C. For. 200° C. |
| Comparison Example 3 | Laminated | 20/70 | 5 | 45 | Block PP (MI-2.0) | 650 | Ext. 250° C. For. 200° C. |
| Comparison Example 4 | Laminated | 20/70 | 20 | 130 | Block PP (MI-2.0) | 930 | Ext. 250° C. For. 200° C. |
| Example 2 | Laminated | 20/70 | 5 | 45 | HDPE (MI-1.0) | 650 | Ext. 250° C. For. 40° C. |
| Comparison Example 5 | Laminated | 20/70 | 5 | 45 | LLDPE (MI-4.0) | 1,350 | Ext. 250° C. For. 200° C. |
| Comparison Example 6 | Laminated | 20/70 | 5 | 45 | E V A (VAC 6%) | 1,100 | Ext. 220° C. For. 160° C. |
| Example 3 | Laminated | 30/70 | 5 | 50 | Block PP (MI-2.0) | 650 | Ext. 210° C. For. 150° C. |
| Comparison Example 7 | Laminated | 20/70 | 5 | 45 | Home PP (MI-2.0) | 210 | Ext. 150° C. For. 100° C. |
| Example 4 | Laminated | 20/70 | 5 | 45 | Block PP (MI-2.0) | 650 | Ext. 250° C. For. 200° C. |
| Comparison Example 9 | Not Laminated | 20/70 | 5 | 45 | Block PP (MI-2.0) | 650 | Ext. 250° C. For. 200° C. |
| Comparison Example 8 | Laminated | 15/70 | 5 | 40 | Block PP (MI-2.0) |  | Ext. 250° C. For. N/A |

Note:
Block PP: ethylene-propylene copolymer (MI = 2.0)
HDPE: high density polyethylene (d = 0.950)
LLDPE: low density linear polyethylene (d = 0.920)
EVA: ethylene-vinyl acetate copolymer (vinyl acetate content = 5%)
Home PP: homopolypropylene (MI = 1.0)
ETX.: upon film extrusion
ELONG: elongation
FOR.: upon score formation Bags filled with 180 g of water/oil suspension were sealed, then were retort-treated (30 min at 121 degrees C.), and thereafter were further boiled for 5 min (content temperature of 98 degree C.). Then they were at once subjected to a sensory test. Further, other bags with the temperature of the contents being held at the room temperature (20 degree C.), vertically dropped onto a concrete floor from the height of 1.2 m so as to carry out a shock resistance test. 100 bags were dropped 5 times, and the number of bags that ruptured was noted. The results are shown in Table 2.

TABLE 2

| | Unsealing Ease | | Drop Resistant Strength |
|---|---|---|---|
| | Breaking Force | Unity of Two Sides | |
| Example 1 | A | A | A (0/100) |
| Comparison Example 1 | C | C | A (0/100) |
| Comparison Example 2 | A | A | C (10/100) |
| Comparison Example 3 | B | B | C (20/100) |
| Comparison Example 4 | C | C | A (0/100) |
| Example 2 | A | A | A (0/100) |
| Comparison Example 5 | B | B | A (0/100) |
| Comparison Example 6 | B | B | C (90/100) |
| Example 3 | A | A | A (0/100) |
| Comparison Example 7 | A | A | C (100/100) |
| Example 4 | A | A | A (0/100) |
| Comparison Example 9 | B | B | A (0/100) |
| Comparison Example 8 | A | A | C (60/100) |

A: Good
B: Satisfactory
C: Insufficient

EXAMPLE 2

Bags were produced under the conditions shown in Table 1, similar to example 1, the thus obtained bags are the same as those of example 1, except that HDPE is used as the polyolefin resin film. The unsealing ease and the drop resistance strength thereof were satisfactory.

EXAMPLE 3

Bags were the same as those of example 1, except that the shape of the score lines on the polyolefin resin film were changed under the conditions shown in Table 1. The unsealing ease and the dropping resistance strength thereof were satisfactory.

EXAMPLE 4

Bags were formed of laminated films each having the polyolefin resin film whose surface have formed thereon the score lines, which was bonded to the aluminum foil. The unsealing ease and the drop resistance strength thereof were satisfactory.

COMPARISON EXAMPLE 1

Bags were formed under the conditions the same as those of the example 1, except that the depth of the score lines is very small. It is clear that the unsealing ease is not good.

COMPARISON EXAMPLE 2

Bags were formed under the conditions the same as those of example 1, except that the depth of the score lines is very large. It is clear that the drop resistance strength is worse.

COMPARISON EXAMPLE 3

Bags were formed under the conditions the same as those of example 1, except the temperature at which the score lines are formed, is decreased greatly. It is clear that the unsealing ease and the drop resistance strength are both not good.

COMPARISON EXAMPLE 4

Bags were formed under the conditions the same as those of example 1, except that the opening angle of the score lines is very large. The unsealing ease is worse.

COMPARISON EXAMPLE 5

Bags were formed under the conditions substantially the same as those of example 2, except that LLDPE is used as the polyolefin resin film which forms the inner surface. It is understood that the elongation of the inner surface film is large, and accordingly, the unsealing ease thereof is worse.

COMPARISON EXAMPLE 6

Bags were formed under the conditions substantially the same as those of example 2, except that EVA is used as the inner surface resin film. The elongation of the inner surface file is large so that the unsealing ease is worse.

COMPARISON EXAMPLE 7

With homopolypropylene having a shock resistance strength of 0.1 kg cm. the drop resistance strength is worse (bag breakage rate: 100/100).

COMPARISON EXAMPLE 8

Bags were formed the same as that of example 1, except that the score lines are not formed, but wedge-like grooves having a depth of 15/70 and an opening angle of 40 degree are formed at intervals of 5 mm by cutting the polyolefin resin film with the use of a slitter or a roll having tip end cutters. It is found that the drop resistance strength is worse.

COMPARISON EXAMPLE 9

Bags were formed as the same as that of example 1, except that no aluminum foil is used. The unsealing easiness is inferior.

It is clear from the comparison between the reference examples and the comparison examples that the present inventions give advantages in respect of all of them.

What is claimed is:

1. A laminated film bag for packaging food, which is formed of a laminated film composed of an outermost layer made of polyester resin film and an innermost layer made of a polyolefin resin film having a shock resistance strength of higher than 0.5 kg cm and an orientation of more than 0.05, and an intermediate layer made of an aluminum foil, wherein said polyolefin film layer has an elongation of less than 1,000 % and has formed thereon, during production of said laminated film, score lines having a depth which is 1/20 to ⅔ of the thickness of the polyolefin resin film layer and an opening width of 0.5 to 7 mm, at intervals of 1 to 15 mm.

2. A laminated film bag for packaging food as set forth in claim 1, wherein the score lines formed on the polyolefin resin film layer are on the surface of the inner surface side of the bag.

3. A laminated film bag for packaging food as set forth in claim 1, wherein the score lines formed on the polyolefin resin film layer are on the surface which is joined to the aluminum foil.

4. A laminated film bag for packaging food as set forth in claim 1, wherein the score lines are laid on both surfaces of the polyolefin resin film layer on the inner surface side of the bag and surface thereof which is joined to the aluminum foil.

5. A laminated film bag for packaging food as set forth in claim 1, wherein a nylon resin film layer is disposed between the polyester film resin layer which is the outermost layer and the aluminum foil.

6. A laminated film bag for packaging food as set forth in claim 1, wherein an adhesive layer is disposed between each adjacent layer.

7. A laminated film bag for packaging food as set forth in claim 1, wherein the score lines have a trapezoidal sectional-shape or V-like sectional-shape having inclined sides which make an angle of 15 to 120 degrees.

8. A laminated film for use in making bags for packaging food, said film comprising an outermost layer of polyester resin film and an innermost layer of polyolefin resin film having a shock resistance strength of higher than 0.5 kg.cm and an orientation of more than 0.05 and an intermediate layer of an aluminum foil, wherein said polyolefin film layer has an elongation of less than 1,000% and has formed thereon, during production of said laminated film, score lines having a depth which is 1/20 to ⅔ of the thickness of the polyolefin resin film layer and an opening width of 0.5 to 7 mm, at intervals of 1 to 15 mm.

* * * * *